United States Patent
Zhao et al.

(10) Patent No.: US 11,858,093 B2
(45) Date of Patent: Jan. 2, 2024

(54) COMPOSITE BINDING AGENT GRINDING WHEEL AND PREPARATION METHOD THEREOF

(71) Applicant: ZHENGZHOU RESEARCH INSTITUTE FOR ABRASIVES & GRINDING CO., LTD., Henan (CN)

(72) Inventors: Yanjun Zhao, Henan (CN); Lihua Wang, Henan (CN); Gaoliang Zhang, Henan (CN); Guanwen Qian, Henan (CN); Donghua Zuo, Henan (CN); Jianfeng Cao, Henan (CN); Guannan Sun, Henan (CN)

(73) Assignee: ZHENGZHOU RESEARCH INSTITUTE FOR ABRASIVES & GRINDING CO., LTD., Henan (CN)

( * ) Notice: Subject to any disclaimer, the term of this patent is extended or adjusted under 35 U.S.C. 154(b) by 71 days.

(21) Appl. No.: 17/555,059

(22) Filed: Dec. 17, 2021

(65) Prior Publication Data
US 2023/0042029 A1 Feb. 9, 2023

(30) Foreign Application Priority Data
Aug. 4, 2021 (CN) .......................... 202110889080.0

(51) Int. Cl.
*B24D 5/02* (2006.01)
*B24D 3/00* (2006.01)
(Continued)

(52) U.S. Cl.
CPC ............... *B24D 5/02* (2013.01); *B24D 3/005* (2013.01); *B24D 3/344* (2013.01);
(Continued)

(58) Field of Classification Search
CPC .......... B24D 5/02; B24D 3/005; B24D 3/344; B24D 18/009; B24D 18/0018; C09K 3/1436; C09K 3/1454
See application file for complete search history.

(56) References Cited

U.S. PATENT DOCUMENTS
2016/0263863 A1 9/2016 Lee et al.

FOREIGN PATENT DOCUMENTS
| CN | 102601745 | 7/2012 |
| CN | 105081990 | 11/2015 |

(Continued)

OTHER PUBLICATIONS

First Search of Chinese Patent Application No. 202110889080.0, dated Apr. 27, 2022, 2 pages.
(Continued)

*Primary Examiner* — Pegah Parvini
(74) *Attorney, Agent, or Firm* — WEGMAN HESSLER VALORE

(57) ABSTRACT

The present application relates to a composite binding agent grinding wheel, wherein a weight percentage of each raw material of the grinding wheel is: 45-65% of pretreatment abrasive, 8-20% of resin bonding agent, 5-12% of hexagonal boron nitride, 5-10% of silicon dioxide, 5-15% of ceramic powder, 6-12% of prealloy powder bonding agent, and 1-3% of boron powder. The composite binding agent super-hard grinding wheel prepared by the present application can achieve nano-level grinding surface quality when grinding epitaxial wafers, and the grinding wheel has strong self-sharpening and high sharpness. It has obvious advantages in the finishing of silicon carbide crystal epitaxial wafers, which can solve the current limitations of back thinning processing of silicon carbide crystal epitaxial wafers.

17 Claims, 1 Drawing Sheet

(51) Int. Cl.
*B24D 3/34* (2006.01)
*B24D 18/00* (2006.01)
*C09K 3/14* (2006.01)

(52) U.S. Cl.
CPC ..... *B24D 18/0009* (2013.01); *B24D 18/0018* (2013.01); *C09K 3/1436* (2013.01); *C09K 3/1454* (2013.01)

(56) References Cited

FOREIGN PATENT DOCUMENTS

| | | |
|---|---|---|
| CN | 105127917 | 12/2015 |
| CN | 109676541 | 4/2019 |
| CN | 109968224 | 7/2019 |
| CN | 111331525 | 6/2020 |
| JP | 2000-198075 | 7/2000 |

OTHER PUBLICATIONS

First Office Action for Chinese Patent Application No. 202110889080.0, dated May 6, 2022, 12 pages.
Notification to grant right for Chinese Patent Application No. 202110889080.0, dated Jun. 20, 2022, 1 page.

COMPOSITE BINDING AGENT GRINDING WHEEL AND PREPARATION METHOD THEREOF

CROSS-REFERENCE TO RELATED APPLICATION

The present application for patent claims priority to Chinese National Patent application filing No. 2021108890800, filed on Aug. 4, 2021 with the Chinese Patent Office, and entitled "Composite Binding Agent Grinding Wheel and Preparation Method Thereof", the contents of which are hereby incorporated herein by reference in its entirety and for all purposes.

TECHNICAL FIELD

The present application belongs to the technical field of grinding, and specifically relates to a composite binding agent grinding wheel and a preparation method thereof.

BACKGROUND

Silicon carbide semiconductors can be used in the manufacture of high-temperature, high-voltage, high-frequency, and high-power electronic devices due to their advantages of large forbidden bandwidth (or "band-gap"), high thermal conductivity, and high breakdown electric field strength. This enables silicon carbide semiconductors to be used in 5G, intelligent manufacturing, aviation, military project and other application fields. They belong to strategic products with broad application prospects.

The quality of silicon carbide epitaxy is a significant factor in the industry chain of silicon carbide semiconductors. The functions of fabricated devices must be realized on the epitaxy and thus the quality of the epitaxial wafer affects the device performance. The fine grinding process of silicon carbide epitaxial wafers belongs to the process of silicon carbide epitaxial processing. The manufacturing cost of silicon carbide epitaxial wafers is high, which makes a high degree of control in the grinding yield and quality desirable. Continuing research to further improve the high quality control in epitaxial processing of silicon carbide semiconductor devices is ongoing.

SUMMARY

Aspects of the present disclosure provide a composite binding agent grinding wheel having advantages over limitations of prior techniques. Disclosed embodiments can provide uniformity dispersion of the nano-level fine-grained grinding wheel to reduce the aggregation of fine-grained abrasives, and improve the chip holding capacity and self-sharpening ability of the fine-grained grinding wheel by cooperating with porous ceramic materials and hexagonal boron nitride. A disclosed grinding wheel exhibits high sharpness, strong grinding ability, high working durability, and good quality stability, which can efficiently remove silicon carbide grinding allowance, and reach nano-level grinding surface quality. The ultra-fine-grained and consolidated super-hard abrasive tool prepared according to embodiments of the present disclosure has little pollution during grinding and high precision of the grinding profile, which can replace the currently used free grinding and polishing process, solve the problems of low processing efficiency, high cost, and poor grinding profile accuracy of the existing processing procedures, and reduce the environmental pollution problems caused by existing procedures.

The present application also provides a preparation method of a disclosed composite binding agent grinding wheel.

In order to achieve the above objectives, the present application adopts the following technical solutions in one or more disclosed embodiments.

Disclosed is a composite binding agent grinding wheel, which can be used for the thinning processing of silicon carbide epitaxial wafers in some embodiments. The grinding wheel is composed of a matrix and an abrasive layer. The weight percentage of each raw material of the abrasive layer is: 45-65% of pretreatment abrasive, 8-20% of resin bonding agent, 5-12% of hexagonal boron nitride, 5-10% of silicon dioxide, 5-15% of ceramic powder, 6-12% of prealloy powder bonding agent, and 1-3% of 3 μm boron powder.

In an embodiment of the above composite binding agent grinding wheel, the pretreatment abrasive is composed of the following raw materials in weight percentage: 48-68% of diamond abrasive, 15-30% of ordinary abrasive, 18-40% of polyethersulfone (PES), and 1-5% of titanate coupling agent.

In a specific embodiment, the grain size of the diamond abrasive is 10000 #-15000 #, the grain size of the ordinary abrasive is 10000 #, and the ordinary abrasive is one of silicon carbide or white corundum.

Further, in an embodiment the pretreatment abrasive can be prepared through the following steps:
1) dissolving PES in dimethylformamide (DMF) to prepare a PES/DMF solution with a mass concentration of 15-25%; adding the titanate coupling agent to the DMF with a mass ratio of 1:100-120, and mixing the resultant uniformly; adding the diamond abrasive and the ordinary abrasive, at a mass ratio of 2-4:1, to the mixed solution obtained in step 2), and mixing the resultant uniformly; then baking the product obtained in step 3) in an oven at 70-90° C. for 2-4 h, until the weight loss mass ratio of DMF in the solution is 40-60%; adding the mixed solution obtained in step 4) to the PES/DMF solution obtained in step 1), and mixing the resultant uniformly to obtain a pretreatment mixed solution; putting the pretreatment mixed solution obtained in step 5) into a plastic syringe (industrial-grade plastic syringe with a diameter of 25.3 mm and a height of 170 mm), which is connected with a metal needle; and then applying a voltage of 40-60 kV to make the pretreatment mixed solution electrosprayed from the metal nozzle of the plastic syringe into a container containing pure water at an injection speed of 50 mm/min, wherein the mixed abrasive wrapped by PES precipitates out of the water; and the electrospraying device can use conventional technology in the field, its structure is not the innovation point of this application, so it will not be descripted here; drying the product obtained in step 6) to obtain a spherical pretreatment abrasive with a grain size of 40-60 μm.

The abrasive can be mixed into the solution containing the coupling agent first, and then added to the PES solution. Since the abrasive directly added to the PES solution can cause agglomeration and interfacial repulsion, the abrasive can be first modified with a coupling agent to increase the compatibility and uniform distribution of the abrasive with the PES solution.

In further embodiments, the resin bonding agent can be a cashew-nut-oil-modified phenolic resin powder with a grain size ranged from 40-60 μm, and common commercial products can be selected. Cashew-nut-oil-modified phenolic resin can improve the heat resistance of the resin and the strength of the resin, and improve the abrasive holding force. The grain size can be between about 40-60 μm, which can be evenly mixed with the pretreatment abrasive to ensure the overall uniformity of the grinding wheel, reduce the grinding scratches and achieve other functions.

The ceramic powder can provide advantages in the formula of the grinding wheel. In one or more embodiments, the ceramic powder is foam ceramic, and the diameter of the ceramic powder is about 60-70 μm. The interior of foam ceramic is in a through-hole structure with a pore size of 10 μm or about 10 μm and a porosity of about 80%. The foam ceramic has high brittleness, good abrasive edge-exposing effect, strong removing power of the grinding wheel, and high sharpness. Additionally, its internal porous structure can play a role in holding chips, reduce grinding clogging, reduce grinding heat, and improve the surface quality of the workpiece. The relating boron powder has a grain size of about 2-5 μm.

The hexagonal boron nitride not only displays a layered arrangement, resulting in good lubricity, but also shows a high thermal conductivity, which is conducive to the discharge of grinding heat, reduces grinding burn and other problems, and improves the quality of the grinding surface. Further preferably, the hexagonal boron nitride is a water-soluble nanosheet of hexagonal boron nitride, and the grain size of its lateral size is several hundred nanometers. It can be prepared by conventional techniques, for example, referring to a Master's Thesis "Preparation of Water-soluble Hexagonal Boron Nitride Nanosheet and Its Application in Composite Materials" in Shantou University, see also Chinese Patent Publication No. CN105293453B filed Nov. 20, 2015 with the Chinese National Intellectual Property Office, each of which are hereby incorporated by reference herein in their respective entireties and for all purposes. The hexagonal boron nitride is an advantageous component in the grinding wheel formula. The water-soluble properties of the water-soluble hexagonal boron nitride nanosheets make it dissolvable during water-cooled grinding, and nano-pores are formed on the grinding wheel, which is beneficial to the edge-exposing (sharpening) of the abrasive and improves the self-sharpening of the grinding wheel.

The prealloy powder bonding agent can be Bi-30Pb-15Sn-9Cd with a grain size of about 200-300 μm, which can be directly purchased commercially. The alloy powder has good fluidity, can be compatible with the interface of the resin binding agent material, and has a cross-coupling effect, so as to reduce grinding damage.

The method for preparing the above composite binding agent grinding wheel includes the following steps:

Putting the pretreatment abrasive, resin bonding agent, prealloy powder bonding agent and ceramic powder into a ultrasonic vibrating screen of 100-300 mesh, mixing the resultant uniformly for later use; putting the boron powder, hexagonal boron nitride and silicon dioxide into anhydrous ethanol at a solid-liquid ratio of 1:40-60, and mixing the resultant uniformly; then transferring the resultant into a vacuum oven with a vacuum degree of −0.03--0.06 MPa and a temperature of 40-60° C. to obtain a non-agglomerated mixture with an ethanol mass percentage of 5-10%; and placing the mixture in a high-frequency vibrator to vibrate and mix, and then drying the resultant in a vacuum oven for later use; mixing the mixed materials prepared in step a) and step b), and then mixing the resultant using an ultrasonic vibrating screen to obtain a uniformly mixed molding material; feeding the molding material into the assembled mold, and heating the molding material to 140-180° C. using microwave heating method, then moving the mold to a vacuum press with a temperature of 140-180° C., applying a pressure of 100-140 MPa to vacuumize to −0.04-0.08 MPa, raising the temperature of the press to 240-280° C., insulating for 6-10 h, taking out the mold to cool to room temperature, and unloading the mold to obtain the grinding wheel block; processing the grinding wheel block into a diamond shape, and then bonding the resultant to the copper matrix. The copper matrix can be customized and produced. In this application, the microporous copper matrix with a pore diameter of 50-260 μm produced by Xinxiang Ruitong Filter Equipment Manufacturing Co., Ltd. is preferably used. The microporous copper matrix is conducive to the deepening of the adhesive layer, improves the adhesive strength of the grinding wheel, and prevents the grinding wheel from falling off during use.

Further, the grinding wheel block is preferably in a quadrangular diamond shape with an acute angle of 60° or about 60°. The diamond-shaped structure can achieve the best grinding contact surface at the initial contact during grinding, and reduce the grinding resistance.

Compared with existing technology, the present application has one or more of the following beneficial effects. The present application provides a grinding wheel for processing silicon carbide epitaxial wafers with nano-level roughness and a preparation method thereof. The resin-bonded grinding wheel prepared by disclosed methods can have good abrasive holding force and effective grinding force, and moreover, the pretreatment for the nano-level abrasive can mitigate or solve problems pertaining to aggregation of fine-grained abrasives and can mitigate or avoid problems of scratching and poor grinding surface quality. In addition, the use of porous ceramic materials and hexagonal boron nitride in the grinding wheel of the present application can help increase the height and speed of the grinding wheel's cutting edge, improve the sharpness of the grinding wheel, and ensure the continuous grinding.

The fine-grinding resin grinding wheel provided by the present application can realize the thinning and finishing processes for silicon carbide epitaxial wafers, which has good grinding edge, self-sharpening and grain-size uniformity, and can effectively solve the problem of the grinding process for silicon carbide epitaxial wafers with nano-level surface roughness. The use of the grinding wheel not only guarantees the requirements for the surface quality of the epitaxial wafer with nano-level roughness, which can realize continuous grinding processing, but also replaces the free grinding process. It replaces the free abrasive grinding process currently used in the industry. It has obvious advantages in the finishing of silicon carbide crystal epitaxial wafers, which can solve the current problem of back thinning processing of silicon carbide crystal epitaxial wafers.

DETAILED DESCRIPTION OF EMBODIMENTS

Figure 1:
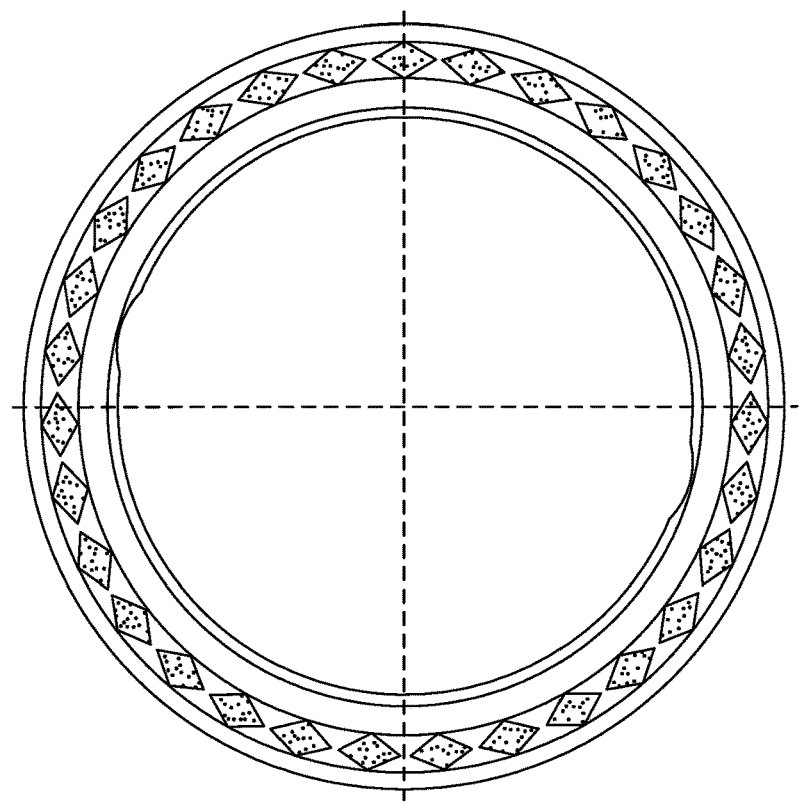
FIG. 1 is a schematic diagram of the structure of the composite binding agent grinding wheel of the present application.

The technical solutions of the present application will be further described in detail below with reference to the embodiments, but the protection scope of the present application is not limited thereto.

Ongoing research to improve the quality of epitaxial processing of silicon carbide material in semiconductor applications is believed to yield advancements in high power, high voltage or high temperature semiconductor applications, among others. However, the hardness of silicon carbide material is second only to diamond, rendering the processing difficult. At present, the finishing of silicon carbide epitaxial wafers mainly adopts a free grinding and polishing process, which has disadvantages such as low processing efficiency, low grinding profile accuracy, high cost, poor control of product quality stability, and insufficient environmental friendliness. Aspects of various embodiments disclosed herein address these and other challenges.

In the following examples, the raw materials involved are commercially-available products or can be prepared by referring to techniques available in the art.

Specifically, an example grain size of diamond abrasive can be in a range from about 10000 #-15000 #, and an example grain size of ordinary abrasive is (about) 10000 #, which are commercially-available products.

An example resin bonding agent can be cashew-nut-oil-modified phenolic resin powder with a grain size of 40-60 μm, which is available for purchase from Tongcheng New Material.

An example hexagonal boron nitride can be a water-soluble nanosheet of hexagonal boron nitride, and the grain size of its lateral size can be several hundred nanometers, which can be prepared by referring to a published Master's Thesis "Preparation of Water-soluble Hexagonal Boron Nitride Nanosheet and Its Application in Composite Materials" in Shantou University, China.

An example ceramic powder can be foam ceramic, and the diameter of the ceramic powder can be 60-70 μm. The boron powder can have a grain size of 3 μm or about 3 μm. The pre-alloy powder bonding agent can be, for example, Bi-30Pb-15Sn-9Cd with a grain size of 200-300 μm, which is a commercially-available product.

EXAMPLE 1

A composite binding agent grinding wheel is composed of a matrix and an abrasive layer. The weight percentage of each raw material of the abrasive layer is: 45% of pretreatment abrasive, 20% of resin bonding agent, 10% of prealloy powder bonding agent, 7% of hexagonal boron nitride, 10% of silicon dioxide, 5% of ceramic powder, and 3% of boron powder.

The pretreatment abrasive is composed of the following raw materials in weight percentage: 57% of diamond abrasive, 19% of ordinary abrasive (white corundum), 22% of PES, and 2% of titanate coupling agent.

The pretreatment abrasive is prepared by the following pretreatment process:

1) dissolving PES in DMF, mechanically stirring and mixing the resultant uniformly (which can be heated to 60° C. and put in the oven for 1 h to make it dissolved completely), to prepare a PES/DMF solution with a mass concentration of 20%;
2) adding the titanate coupling agent to the DMF in a mass ratio of 1:100, and mixing the resultant uniformly by high-frequency vibration for 10 min;
3) adding the diamond abrasive and the ordinary abrasive, at a mass ratio of 3:1, to the mixed solution obtained in 2), and mixing the resultant uniformly by high-frequency vibration and mechanically mixing for 1 h;
4) baking the product obtained in step 3) in an oven at 80° C. for 3 h, until the weight loss mass ratio of DMF in the solution is 50%;
5) adding the mixed solution obtained in step 4) to the PES/DMF solution obtained in step 1), and mixing the resultant uniformly by ultrasonic and mechanical stirring for 3 h, to obtain a pretreatment mixed solution;
6) putting the pretreatment mixed solution obtained in step 5) into an industrial-grade plastic syringe with a diameter of 25.3 mm and a height of 170 mm, which is connected with a metal needle (nozzle diameter: 2 mm); and then applying a voltage of 50 kV to make the pretreatment mixed solution electrosprayed from the metal nozzle of the plastic syringe into a container containing pure water at an injection speed of 50 mm/min, wherein the mixed abrasive wrapped by PES precipitates out of the water; and
7) drying the product obtained in step 6) to obtain a spherical pretreatment abrasive with a grain size about 50 μm.

Figure 2:
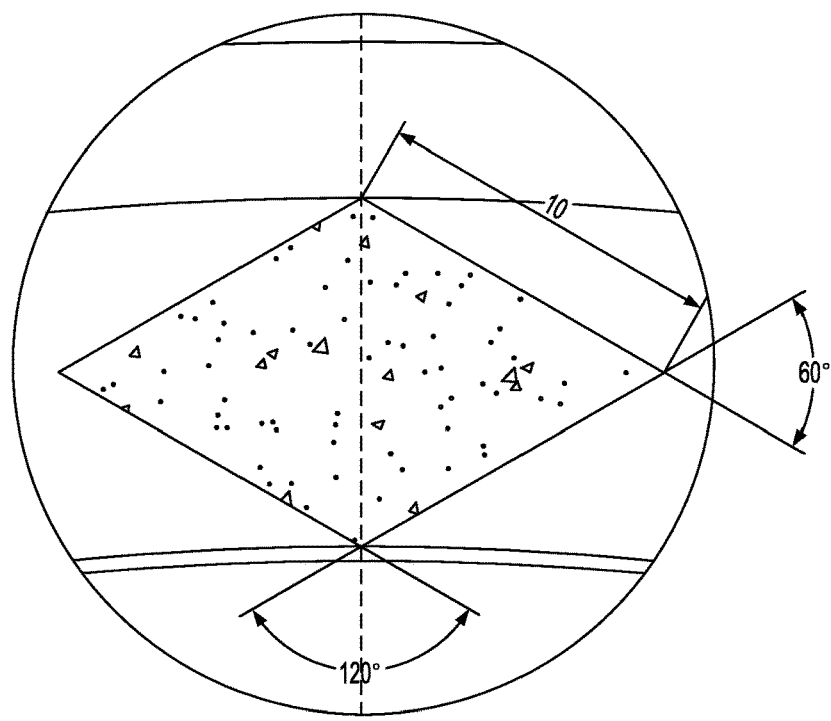
FIG. 2 is a schematic diagram of the structure of the grinding wheel block in FIG. 1.

The method for preparing the above composite binding agent grinding wheel specifically includes the following steps:

a) putting the pretreatment abrasive, resin bonding agent, prealloy powder bonding agent and ceramic powder into an ultrasonic vibrating screen of 200 mesh, mixing the resultant for 30 min to be uniform for later use;
b) putting boron powder, hexagonal boron nitride and silicon oxide into anhydrous ethanol at a solid-to-liquid ratio (g/g) of 1:50, and mixing the resultant uniformly by ultrasonic and mechanical stirring for 2 h, then putting the resultant into a vacuum oven with a vacuum degree of −0.05 MPa and a temperature of 60° C. and baking the same for about 2 h to obtain a non-agglomerated mixture with an ethanol content of 5% by mass, and placing this mixture in a high-frequency vibrator to vibrate and mix the same for 2 min, then drying the resultant in a vacuum oven at 60° C. for later use;
c) mixing the mixed materials prepared in step a) and step b), and then mixing the resultant for 1 h by putting the resultant into an ultrasonic vibrating screen of 150 mesh to obtain a uniformly mixed molding material;
d) feeding the molding material into the assembled mold, and heating the molding material to 160° C. using microwave heating method within 2 min, then moving the mold to a vacuum press with a temperature of 160° C., applying a pressure of 120 MPa to vacuumize to −0.04-0.08 MPa, raising the temperature of the press to 240° C., maintaining the temperature for 8 h, taking out the mold to cool to room temperature and unloading the mold to obtain the grinding wheel block;
e) processing the grinding wheel block into a diamond-shape structure (a quadrangular diamond shape with an acute angle of 60°, see FIG. 2), and then bonding the resultant to the microporous copper matrix (see FIG. 1). In this application, the microporous copper matrix with a pore diameter of 50-260 μm produced by Xinxiang Ruitong Filter Equipment Manufacturing Co., Ltd. is used.

EXAMPLE 2

A composite binding agent grinding wheel is composed of a matrix and an abrasive layer. The weight percentage of each raw material of the abrasive layer is: 62% of pretreatment abrasive, 8% of resin bonding agent, 8% of prealloy powder bonding agent, 5% of hexagonal boron nitride, 8% of silicon dioxide, 8% of ceramic powder, and 1% of boron powder.

Reference can be made to Example 1 for the raw material ratio and preparation method of the pretreatment abrasive.

The method for preparing the above composite binding agent grinding wheel specifically includes the following steps:
a) putting the pretreatment abrasive, resin bonding agent, prealloy powder bonding agent and ceramic powder into a ultrasonic vibrating screen of 200 mesh, mixing the resultant for 30 min to be uniform for later use;
b) putting boron powder, hexagonal boron nitride and silicon oxide into anhydrous ethanol at a solid-to-liquid ratio (g/g) of 1:50, and mixing the resultant uniformly by ultrasonic and mechanical stirring for 2 h, then putting the resultant into a vacuum oven with a vacuum degree of −0.04 MPa and a temperature of 60° C. and baking the same for about 2 h to obtain a non-agglomerated mixture with an ethanol content of 5% by mass, and placing this mixture in a high-frequency vibrator to vibrate and mix the same for 2 min, then drying the resultant in a vacuum oven at 60° C. for later use;
c) mixing the mixed materials prepared in step a) and step b), and then mixing the resultant for 1 h by putting the resultant into an ultrasonic vibrating screen of 150 mesh to obtain a uniformly mixed molding material;
d) feeding the molding material into the assembled mold, and heating the molding material to 170° C. using microwave heating method within 2 min, then moving the mold to a vacuum press with a temperature of 160° C., applying a pressure of 120 MPa to vacuumize to −0.04-0.08 MPa, raising the temperature of the press to 280° C., maintaining the temperature for 8 h, taking out the mold to cool to room temperature and unloading the mold to obtain the grinding wheel block;
e) processing the grinding wheel block into a diamond-shape structure (a quadrangular diamond shape with an acute angle of 60° and then bonding the resultant to the microporous copper matrix. In this application, the microporous copper matrix with a pore diameter of 50-260 μm produced by Xinxiang Ruitong Filter Equipment Manufacturing Co., Ltd. is used.

EXAMPLE 3

A composite binding agent grinding wheel is composed of a matrix and an abrasive layer. The weight percentage of each raw material of the abrasive layer is: 50% of pretreatment abrasive, 12% of resin bonding agent, 12% of prealloy powder bonding agent, 6% of hexagonal boron nitride, 5% of silicon dioxide, 13% of ceramic powder, and 2% of boron powder.

Reference can be made to Example 1 for the raw material ratio and preparation method of the pretreatment abrasive.

The method for preparing the above composite binding agent grinding wheel specifically includes the following steps:
a) putting the pretreatment abrasive, resin bonding agent, prealloy powder bonding agent and ceramic powder into a ultrasonic vibrating screen of 200 mesh, mixing the resultant for 30 min to be uniform for later use;
b) putting boron powder, hexagonal boron nitride and silicon oxide into anhydrous ethanol at a solid-to-liquid ratio (g/g) of 1:50, and mixing the resultant uniformly by ultrasonic and mechanical stirring for 2 h, then putting the resultant into a vacuum oven with a vacuum degree of −0.06 MPa and a temperature of 60° C. and baking the same for about 2 h to obtain a non-agglomerated mixture with an ethanol content of 5% by mass, and placing this mixture in a high-frequency vibrator to vibrate and mix the same for 2 min, then drying the resultant in a vacuum oven at 60° C. for later use;
c) mixing the mixed materials prepared in step a) and step b), and then mixing the resultant for 1 h by putting the resultant into an ultrasonic vibrating screen of 150 mesh to obtain a uniformly mixed molding material;
d) feeding the molding material into the assembled mold, and using microwave heating to heat the molding material to 150° C. within 2 min, then moving the mold to a vacuum press with a temperature of 160° C., applying a pressure of 120 MPa to vacuumize to −0.04-0.08 MPa, raising the temperature of the press to 260° C., maintaining the temperature for 8 h, taking out the mold to cool to room temperature and unloading the mold to obtain the grinding wheel block;
e) processing the grinding wheel block into a diamond-shape structure (a quadrangular diamond shape with an acute angle of 60° and then bonding the resultant to the microporous copper matrix. In this application, the microporous copper matrix with a pore diameter of 50-260 μm produced by Xinxiang Ruitong Filter Equipment Manufacturing Co., Ltd. is used.

EXAMPLE 4

A composite binding agent grinding wheel is composed of a matrix and an abrasive layer. The weight percentage of each raw material of the abrasive layer is: 52% of pretreatment abrasive, 13% of resin bonding agent, 6% of alloy powder, 12% of hexagonal boron nitride, 7% of silicon dioxide, 8% of ceramic powder, and 2% of boron powder.

Reference can be made to Example 1 for the raw material ratio and preparation method of the pretreatment abrasive.

Reference can be made to Example 1 for the preparation method of the above composite binding agent grinding wheel.

COMPARATIVE EXAMPLE 1

The pretreatment abrasive in Example 1 is changed to an abrasive that has not undergone pretreatment (that is, the abrasive formula remains unchanged, but the pretreatment process is not proceeded), and the rest refers to Example 1 to prepare the grinding wheel.

COMPARATIVE EXAMPLE 2

Conventional grinding wheel formula, the weight percentage of each composition of the raw material thereof is: 45% of diamond abrasive, 25% of phenolic resin powder, 20% of silicon carbide, 3% of chromic oxide, and 7% of white corundum. With this formula, the grinding wheel is prepared by the conventional hot pressing method.

COMPARATIVE EXAMPLE 3

The hexagonal boron nitride in Example 3 is changed to graphite; and the structure of the grinding wheel block is changed to a common arc structure to prepare a grinding wheel.

Grinding Test

When the grinding and polishing liquid is used for processing, that is, titanium dioxide and cerium oxide are used as the grinding and polishing liquid for the abrasives to process the four-inch silicon carbide epitaxial wafer, the material removal rate is less than 0.3 µm/h. Polishing of 3 µm takes 10 h, and the efficiency is extremely low. It requires more than 20 L of polishing liquid. The surface roughness of the workpiece is Ra=0.3 nm, wherein TTV<4 µm. Compared with the grinding wheel of the present application, the grinding efficiency is low, the profile accuracy is poor, the pollution is large, and the cost is high.

The following table shows the grinding effects of the grinding wheels prepared in Examples 1 to 4 and Comparative Examples 1 to 3.

It can be seen from Table 1 that compared with the comparative examples, the grinding wheel of the present application has higher grinding efficiency, better profile accuracy, less pollution, and lower cost. The grinding wheels prepared by the comparative examples often have lower processing efficiency, and substandard grinding surface quality, which cannot work continuously; and the surface of the workpiece has coarse grinding lines, poor profile accuracy, frequent repairs and other defects.

TABLE 1

Grinding comparison results of grinding wheels prepared in different examples and comparative examples

| Example | Processing Condition | Processing Effect | Comparison of Results |
|---|---|---|---|
| Example 1 | 4-inch silicon carbide epitaxial wafer, machine tool: Korea AM, rotational speed of 1500 rpm, grinding for 5 µm, single feed of 0.03 µm/s. | material removal rate of 108 µm/h, processing time of 0.046 h, Ra = 0.28 nm, TTV < 3 µm. It can perform processing continuously without repairing and maintaining. | higher efficiency, better profile accuracy, lower pollution and lower cost |
| Example 2 | 4-inch silicon carbide epitaxial wafer, machine tool: Korea AM, rotational speed of 1650 rpm, grinding for 4 µm, single feed of 0.025 µm/s. | material removal rate of 90 µm/h, processing time of 0.044 h, Ra = 0.25 nm, TTV < 2.6 µm. It can perform processing continuously without repairing and maintaining. | |
| Example 3 | 4-inch silicon carbide epitaxial wafer, machine tool: Korea AM, rotational speed of 1900 rpm, grinding for 3 µm, single feed of 0.015 µm/s. | material removal rate of 54 µm/h, processing time of 0.056 h, Ra = 0.22 nm, TTV < 1.8 µm. It can perform processing continuously without repairing and maintaining. | |
| Example 4 | 4-inch silicon carbide epitaxial wafer, machine tool: Korea AM, rotational speed of 1800 rpm, grinding for 4 µm, single feed of 0.015 µm/s. | material removal rate of 54 µm/h, processing time of 0.074 h, Ra = 0.19 nm, TTV < 2 µm. It can perform processing continuously without repairing and maintaining. | |
| Comparative Example 1 | 4-inch silicon carbide epitaxial wafer, machine tool: Korea AM, rotational speed of 1500 rpm, grinding for 5 µm, single feed of 0.03 µm/s. | The surface of the workpiece is burnt when the feed of grinding wheel is 0.03 µm/s in a single time; when the feed rate is reduced to 0.01 µm/s, the grinding wheel can be repaired and maintained after grinding 2 pieces | The processing efficiency is low, the grinding quality is not up to standard, and continuous work cannot be performed. |
| Comparative Example 2 | 4-inch silicon carbide epitaxial wafer, machine tool: Korea AM, rotational speed of 1650 rpm, grinding for 4 µm. | The work cannot be performed even when the grinding feed rate is adjusted. The surface of the grinded workpiece is burnt and cracked, which cannot meet the grinding requirements. | The work cannot be performed. |

TABLE 1-continued

Grinding comparison results of grinding wheels prepared in different examples and comparative examples

| Example | Processing Condition | Processing Effect | Comparison of Results |
|---|---|---|---|
| Comparative Example 3 | 4-inch silicon carbide epitaxial wafer, machine tool: Korea AM, rotational speed of 1900 rpm, grinding for 3 μm, single feed of 0.015 μm/s. | After grinding 4 pieces, the grinding wheel can be repaired and maintained, and the surface roughness of the workpiece reaches Ra = 0.5 nm; TTV < 3.6 μm. | The surface of the workpiece has coarse grinding lines, and poor profile accuracy, and is benefitted by frequent repairing and maintaining. |

In summary, it can be concluded that the resin super-hard grinding wheel prepared by the present application can achieve nano-level grinding surface quality when grinding epitaxial wafers, and the grinding wheel has strong self-sharpening and high sharpness. It has obvious advantages in the finishing of silicon carbide epitaxial wafers in back thinning processing, which can solve the current problem of back processing of silicon carbide epitaxial wafers.

As utilized herein, relative terms or terms of degree such as approximately, substantially or like relative terms such as about, roughly and so forth, are intended to incorporate ranges and variations about a qualified term reasonably encountered by one of ordinary skill in the art in fabricating or compiling the embodiments disclosed herein, where not explicitly specified otherwise. For instance, a relative term can refer to ranges of manufacturing tolerances associated with suitable manufacturing equipment (e.g., injection molding equipment, extrusion equipment, solution mixing equipment, precipitation equipment, solution baking or drying equipment, and so forth) for realizing a mixture, solution, structure, apparatus or the like from a disclosed illustration or description. In some embodiments, depending on context and the capabilities of one of ordinary skill in the art, relative terminology can refer to a variation in a disclosed quantity, range of quantities or a disclosed characteristic; e.g., a 0 to 2-percent variance, a 0 to 3-percent variance, a 0 to five-percent variance or a zero to ten-percent variance from precise mathematically defined value or characteristic, or any suitable value or range there between based on suitable fabrication equipment and accuracy thereof, can define a scope for a disclosed term of degree. These or similar variances can be applicable to other contexts in which a term of degree is utilized herein such as timing of a computer-controlled signal (e.g., in mixing, heating or extraction process), accuracy of measurement of a physical effect (e.g., a temperature of solution or solute, a mass weight, a relative mass ratio, etc.) or the like.

In regard to the various functions performed by the above described components, machines, apparatuses, devices, processes, control operations and the like, the terms (including a reference to a "means") used to describe such components, etc., are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as mechanical structures, mechanical drives, electronic or electro-mechanical drive controllers, and electronic hardware configured to implement the functions, or a computer-readable medium having computer-executable instructions for performing the acts or events of the various processes or control operations described herein.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. Moreover, embodiments described in a particular drawing or group of drawings should not be construed as being limited to those illustrations. Rather, any suitable combination or subset of elements from one drawing(s) can be applied to other embodiments in other drawings where suitable to one of ordinary skill in the art to accomplish objectives disclosed herein, objectives known in the art, or objectives and operation reasonably conveyed to one of ordinary skill in the art by way of the context provided in this specification. Where utilized, block diagrams of the disclosed embodiments or flow charts are grouped for ease of understanding. However, it should be understood that combinations of blocks, additions of new blocks, re-arrangement of blocks, and the like are contemplated in alternative embodiments of the present disclosure.

Based on the foregoing it should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A composite binding agent grinding wheel, wherein the grinding wheel comprising a matrix and an abrasive layer, wherein a weight percentage of each raw material of the abrasive layer is: 45-65% of a pretreatment abrasive, 8-20% of a resin bonding agent, 5-12% of hexagonal boron nitride, 5-10% of silicon dioxide, 5-15% of a ceramic powder, 6-12% of a prealloy powder bonding agent, and 1-3% of a boron powder.

2. The composite binding agent grinding wheel according to claim 1, wherein the pretreatment abrasive comprises the following raw materials in weight percentage: 48-68% of diamond abrasive, 15-30% of ordinary abrasive, 18-40% of polyethersulfone (PES), and 1-5% of titanate coupling agent.

3. The composite binding agent grinding wheel according to claim 2, wherein a grain size of the diamond abrasive is 10000 #-15000 #, a grain size of the ordinary abrasive is 10000 #, and the ordinary abrasive is one of silicon carbide or white corundum.

4. The composite binding agent grinding wheel according to claim 2, wherein preparation of the pretreatment abrasive comprises:
   dissolving PES in dimethylformamide (DMF) to prepare a PES/DMF solution with a mass concentration of 15-25%;
   adding the titanate coupling agent to the DMF in a mass ratio of 1: a range of 100-120, and mixing a resultant uniformly to form a mixed resultant;
   adding the diamond abrasive and the ordinary abrasive, at a mass ratio of a second range of 2-4:1, to the mixed resultant, and mixing a resultant uniformly to form a second mixed resultant;
   baking the second mixed resultant at a temperature in a range from 70-90° C., until a weight loss percentage of the DMF in a solution is 40-60% to form a baked resultant;
   adding the baked resultant to the PES/DMF solution with the mass concentration of 15-25%, and mixing a resultant uniformly to obtain a pretreatment mixed solution;
   electro-spraying the pretreatment mixed solution with an applied voltage of 40-60 kV into a container containing pure water at an injection speed of 50 mm/min, wherein a mixed abrasive wrapped by PES precipitates out of water; and
   drying a product of the electro-spraying pretreatment mixed solution into the pure water to obtain a spherical pretreatment abrasive with a grain size of 40-60 μm.

5. The composite binding agent grinding wheel according to claim 1, wherein the resin bonding agent is cashew-nut-oil-modified phenolic resin powder with a grain size of 40-60 μm.

6. The composite binding agent grinding wheel according to claim 1, wherein the ceramic powder is foam ceramic, and a diameter of the ceramic powder is 60-70 μm, and a particle size of the boron powder is 2-5 μm.

7. The composite binding agent grinding wheel according to claim 1, wherein the hexagonal boron nitride is a water-soluble nanosheet of hexagonal boron nitride.

8. The composite binding agent grinding wheel according to claim 1, wherein the prealloy powder bonding agent is Bi-30Pb-15Sn-9Cd with a grain size of 200-300 μm.

9. A method for preparing the composite binding agent grinding wheel according to claim 1, comprising:
   putting the pretreatment abrasive, the resin bonding agent, the prealloy powder bonding agent and the ceramic powder into an ultrasonic vibrating screen of 100-300 mesh, mixing a resultant uniformly to form a mixed resultant;
   putting the boron powder, the hexagonal boron nitride and the silicon dioxide into anhydrous ethanol at a solid-liquid ratio of 1: to a range of 40-60, and mixing a resultant uniformly to form a second mixed resultant; then transferring the second mixed resultant into a vacuum oven, and forming a non-agglomerated mixture with an ethanol mass percentage of 5-10%; and placing the non-agglomerated mixture in a high-frequency vibrator to vibrate and mix, and then drying a third mixed resultant in a vacuum oven;
   mixing the mixed resultant and the third mixed resultant to form a fourth mixed resultant, and then mixing the fourth mixed resultant using an ultrasonic vibrating screen, so as to obtain a mixed molding material;
   feeding the mixed molding material into a mold, and heating the mixed molding material to a range between 140-180° C. using a microwave heating method, then moving the mold to a vacuum press with a temperature of 140-180° C., applying a pressure of 100-140 MPa to vacuumize to −0.04-0.08 MPa, raising a temperature of the press to 240-280° C., insulating for 6-10 hours, taking out the mold to cool to room temperature, and unloading the mold to obtain a grinding wheel block; and
   processing the grinding wheel block into a diamond shape or approximate diamond shape, and then bonding a resultant diamond shape grinding wheel block to a copper matrix.

10. The method for preparing the composite binding agent grinding wheel according to claim 9, wherein the grinding wheel block is of a quadrangular diamond shape with an acute angle of 60°.

11. The method for preparing the composite binding agent grinding wheel according to claim 9, wherein the pretreatment abrasive comprises the following raw materials in weight percentage selected from the following ranges: 48-68% of diamond abrasive, 15-30% of ordinary abrasive, 18-40% of polyethersulfone, and 1-5% of titanate coupling agent.

12. The method for preparing the composite binding agent grinding wheel according to claim 11, wherein a grain size of the diamond abrasive is in a range of 10000 #-15000 #, a grain size of the ordinary abrasive is 10000 #, and the ordinary abrasive is one of silicon carbide or white corundum.

13. The method for preparing the composite binding agent grinding wheel according to claim 11, wherein preparation of the pretreatment abrasive comprises:
   dissolving polyethersulfone in dimethylformamide to prepare a polyethersulfone mixed solution with a mass concentration of 15-25%;
   adding the titanate coupling agent to the dimethylformamide in a mass ratio of 1: to a range of 100-120, and mixing a resultant to form a mixed resultant;
   adding the diamond abrasive and the ordinary abrasive, at a mass ratio of a range of 2-4:1, to the mixed resultant, and mixing a resultant to form a second mixed resultant;
   then baking the second mixed resultant at 70-90° C., until a weight loss percentage of the dimethylformamide in a solution is 40-60% to form a baked resultant;

adding the baked resultant to the polyethersulfone mixed solution with the mass concentration of 15-25%, and mixing the resultant uniformly to obtain a pretreatment mixed solution;

electro-spraying the pretreatment mixed solution at an applied voltage of 40-60 kv into a container containing pure water at a injection speed of 50 mm/min, wherein a mixed abrasive wrapped by polyethersulfone precipitates out of water; and drying a product of the electro-spraying the pretreatment mixed solution into the pure water to obtain a spherical pretreatment abrasive with a grain size of 40-60 μm.

14. The method for preparing the composite binding agent grinding wheel according to claim 9, wherein the resin bonding agent is cashew-nut-oil-modified phenolic resin powder with a grain size of 40-60 μm.

15. The method for preparing the composite binding agent grinding wheel according to claim 9, wherein the ceramic powder is foam ceramic, and a diameter of the ceramic powder is 60-70 μm, and a particle size of the boron powder is 2-5 μm.

16. The method for preparing the composite binding agent grinding wheel according to claim 9, wherein the hexagonal boron nitride is a water-soluble nanosheet of hexagonal boron nitride.

17. The method for preparing the composite binding agent grinding wheel according to claim 9, wherein the prealloy powder bonding agent is Bi-30Pb-15Sn-9Cd with a grain size of 200-300 μm.

* * * * *